Jan. 30, 1962     C. G. GORDON     3,018,795
ELECTRO-HYDRAULIC SERVO VALVES
Filed Sept. 12, 1960     2 Sheets-Sheet 1
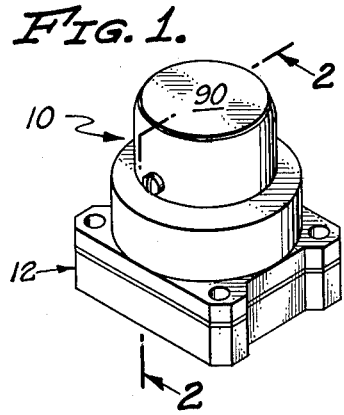
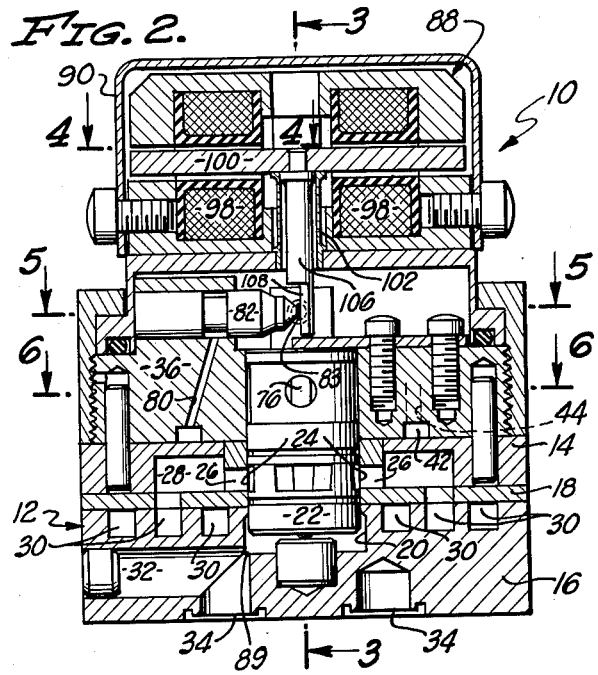
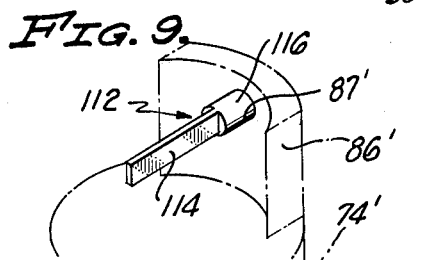
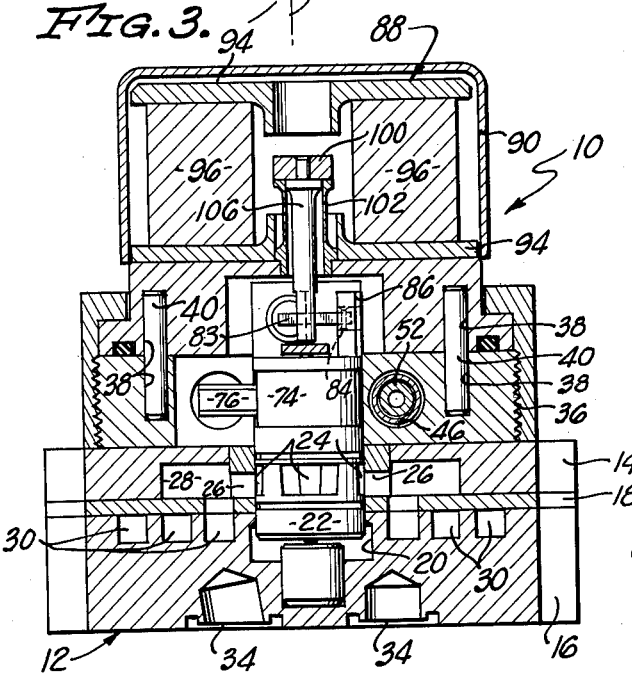
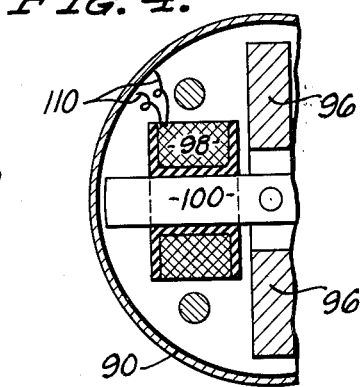
INVENTOR.
CARROLL G. GORDON
BY
ATTORNEY

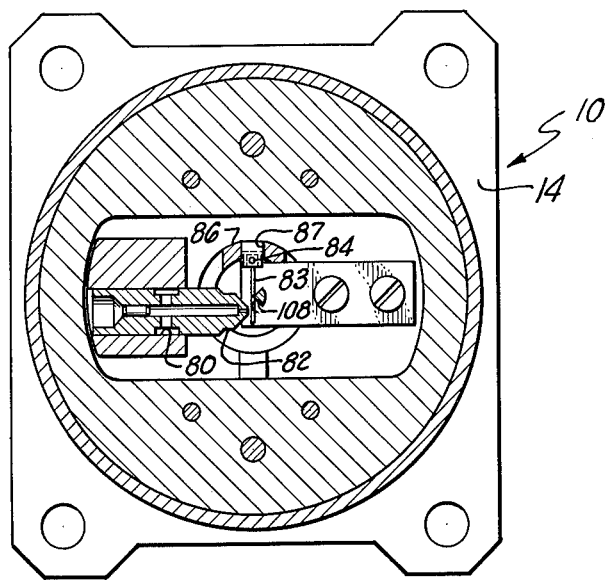
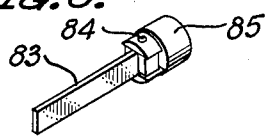
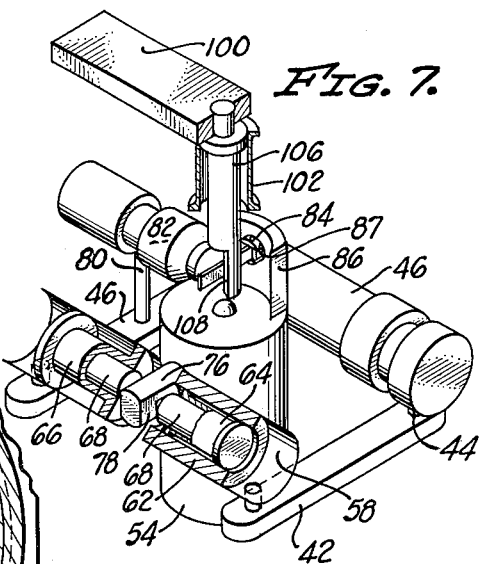
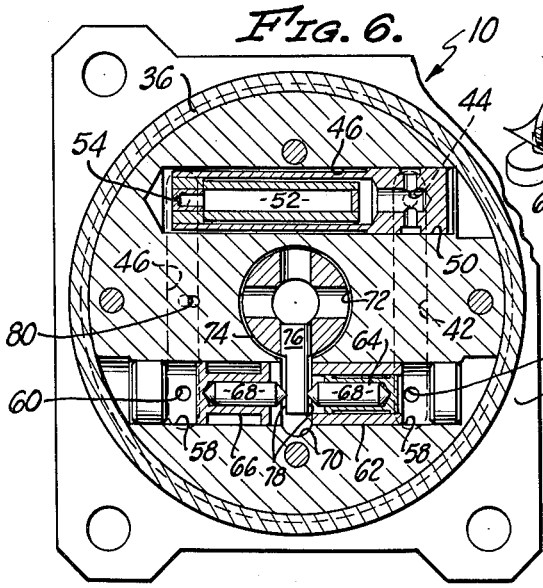
INVENTOR.
CARROLL G. GORDON
BY
ATTORNEY

United States Patent Office 3,018,795
Patented Jan. 30, 1962

3,018,795
ELECTRO-HYDRAULIC SERVO VALVES
Carroll G. Gordon, 3 William Court, Menlo Park, Calif.
Filed Sept. 12, 1960, Ser. No. 55,244
10 Claims. (Cl. 137—623)

This invention pertains to new and improved electro-hydraulic servo valves and more specifically to valves of a mechanical feed-back type.

Electro-hydraulic servo valves as a class are utilized in aircraft, missiles and a wide variety of other installations in order to control the flow of hydraulic fluid under pressure in response to an electrical signal. For industrial applications the weights and sizes of such valves are not as a general rule critical. However, for other applications, such as in the aircraft field electro-hydraulic servo valves to be acceptable must be comparatively small and light in weight. Further, they must be responsive to electrical signals of comparatively small magnitude using voltages of the type commonly used in many aircraft and missile installations. Electro-hydraulic servo valves to be acceptable for either aircraft or aircraft type of usage or for industrial application must, of course, also be extremely reliable in operation and be capable of performing satisfactorily under extremely adverse circumstances.

A broad object of the present invention is to provide new and improved electro-hydraulic servo valves meeting the requirements indicated briefly in the preceding discussion. Another object of this invention is to provide electro-hydraulic servo valves which will perform reliably under virtually all circumstances, even when these valves are used to control hydraulic fluid at extreme pressures such as would tend to affect the operation of prior related structures. A still further object of the present invention is to provide electro-hydraulic servo valves which are responsive to electrical signals of comparatively small magnitudes and which utilize such signals to effectively control the operation of valve parts by utilizing the pressure of hydraulic fluids supplied to such valves in a mechanical feed-back manner, so as to cause a desired valve type action to be achieved. Another object of the present invention is to provide electro-hydraulic servo valves as indicated which are comparatively light in weight and which may be easily and conveniently constructed at comparatively nominal cost.

These and other objects of this invention as well as many advantages of it will be more fully apparent from a detailed consideration of the remainder of this specification, including the appended claims and the accompanying drawings in which:

FIG. 1 is a perspective view of an electro-hydraulic servo valve of this invention;

FIG. 2 is a cross-sectional view taken at line 2—2 of FIG. 1;

FIG. 3 is a cross-sectional view taken at line 3—3 of FIG. 2;

FIG. 4 is a cross-sectional view taken at line 4—4 of FIG. 2;

FIG. 5 is a cross-sectional view taken at line 5—5 of FIG. 2;

FIG. 6 is a cross-sectional view taken at line 6—6 of FIG. 2;

FIG. 7 is a perspective, diagrammatic view indicating certain operative parts employed in the valve shown in the preceding figures;

FIG. 8 is a perspective exploded view showing certain operative parts employed in the valve shown in the preceding figures;

FIG. 9 is a partial view corresponding to part of FIG. 8 indicating a modified electro-hydraulic servo valve in accordance with this invention.

The accompanying drawings are primarily intended so as to clearly illustrate two different presently preferred embodiments or forms of this invention. It will be realized that the present invention is not restricted to valves constructed precisely as shown in these drawings inasmuch as the principles of this invention may be applied in a number of different ways. A number of differently appearing electro-hydraulic servo valves utilizing these principles may be readily created through the use or exercise of routine engineering skill or ability.

As an aid to understanding this invention it can be stated in essentially summary form that it concerns electro-hydraulic servo valves, each of which includes in combination a balanced type of rotary valve which is connected to what may be termed "mechanical feed-back means" which in turn are operatively connected to a torque motor capable of creating a comparatively small amount of physical movement affecting such mechanical feed-back means. When such movement occurs the fluid pressure normally supplied to the complete electro-hydraulic servo valve is utilized by such mechanical feed back means in order to cause rotation of the valve rotor employed.

Because of the nature of this invention it is relatively difficult to understand it from a brief summary such as this.

This invention is best more fully explained by referring directly to the accompanying drawings in which there is shown a complete electro-hydraulic servo valve 10 of the present invention which employs a valve housing 12 consisting of upper and lower valve bodies 14 and 16 separated from one another by a port plate 18. These bodies 14 and 16 and the plate 18 define an internal cylindrical rotor cavity 20 in the housing 12. In this cavity 20 there is disposed a cylindrical valve rotor 22 having eight of notches 24 spaced equi-spaced from one another around its periphery.

These notches 24 are spaced adjacent to eight equidistantly spaced valve ports 26 leading from the cavity 20 to radial passages 28 formed in the surface of the upper valve body 14 adjacent to the port plate 18. These passages 28 are in communication with pressure, return and supply ports 30 located on the exposed surface of the lower valve body 16 through grooves 32 in the surface of the lower valve body 16 against the port plate 18, and connecting passages 34. These ports 30 are, of course, adapted to be connected in the established manner to various service lines (not shown) during the use of the complete valve 10.

The actual valve structure including the housing 12 and the various parts of it explained in the preceding is preferably formed as indicated in detail in the copending application Serial No. 836,504, filed August 27, 1959, entitled "Electro-Hydraulic Servo Valves." This structure constitutes what may be considered to be "balanced" rotary valve which may be satisfactorily used in controlling the flow of hydraulic fluids at even extremely elevated pressures. A complete, detailed description of the valve structure set forth in this copending application is not set forth in this specification since it is not necessary to a complete understanding of this invention. Other equivalent rotary valve structures can, however, be employed with the present invention. A suitable balanced type rotary valve is shown in the co-pending application Serial No. 55,653, filed September 13, 1960, entitled "Hydraulic Servo Valves."

Within the valve 10 a mounting block 36 is attached to the surface of the upper valve body 14 remote from the various other parts of the housing 12. This block 36 may be conveniently secured in place by furnace brazing or other similar techniques such as are capable of being employed in order to secure the upper and lower valve bodies 14 and 16 and the port plate 18 to one another. If desired, alignment holes 38 may be formed in the upper valve body 14 and the block 36 so as to receive alignment pins 40 serving to aid in initially positioning the block 36 with respect to the upper valve body 14.

This block 36 is preferably formed so as to include an elongated linear groove 42 which extends in along a part of its surface adjacent to the upper valve body 14. The groove 42 is preferably connected to the one of the passages 28 containing hydraulic fluid under pressure as the valve 10 is normally connected for use. In connection with the construction of these passages 28 and the location of this hole 44 so as to accomplish this purpose reference is made to the co-pending application Serial No. 836,504 (noted above). Another groove 46 similar to the groove 42 is located in the surface of the block 36 against the upper valve body 14 on the side of this block 36 remote from the groove 42. Thus, the two grooves 42 and 46 are located on opposite sides of the rotor 22 employed.

The extremities of the grooves 42 and 46 are connected by means of an elongated, enlarged cylindrical passage 48 formed in the block 36. This passage 48 holds a cartridge 50 which in turn holds a porous filter element 52 such as a sintered metal filter element of a type commonly used for many purposes. This cartridge also holds an orifice 54 of restricted or small dimension which is designed so as to cause a pressure drop in hydraulic fluid moving through the passage 48 from the groove 42 to the groove 46. A drop of pressure in such fluid is also caused by the filter element 52. With this construction any fluid moving from the groove 42 to the groove 46 through the passage 48 must, of course, pass through this filter element 52 and the orifice 54.

The extremities of the grooves 42 and 46 remote from the passage 48 are both connected to closed ends 56 of open-ended cylinders 58 by means of small holes 60 formed in the block 36. In the embodiment of the invention shown the two cylinders 58 are illustrated as being formed of identical diameters. In order to reduce the effective diameter of the one of cylinders 58 connected to the groove 42 a small sleeve 62 is secured to the interior of this cylinder. This sleeve 62 carries a movable piston 64 which is of smaller cross-sectional area than another movable piston 66 located in the other of the cylinders 58. These pistons 64 and 66 both carry pointed actuating rods 68 which extend from them and from the cylinders 58 into a cavity 70.

This cavity 70 is formed much as a slot so as to extend in the mounting block 36 radially away from a rotor cavity 72 which is also formed in this block 36. The rotor cavity 72 in effect constitutes an extension of the rotor cavity 20 of the housing 12, and its walls are preferably contiguous with the walls of this cavity 20. In this structure the rotor 22 is formed so as to include a generally cylindrical extension 74 which extends up into the cavity 72. This extension 74 carries a radial arm 76 which extends into the cavity 70. The arm 76 has flat sides 78 (FIG. 7) which are contacted by the pointed ends of the rods 68.

The hydraulic fluid under pressure supplied to the complete valve 10 as it is connected for normal usage is supplied to the pistons 64 and 66 so as to hold the rods 68 in constant contact with the opposite sides 78 of the arm 76. With this construction movement of the pistons 64 and 66 is transmitted to the arm 76 so as to cause rotation of the complete valve rotor 22 including all parts attached to it. This valve rotor 22 and the various parts used in association with it are proportioned so that limited movement of the pistons 64 and 66 causes sufficient rotation of the rotor 22 to shift notches 24 with respect to the valve ports 26 so as to make the valve 10 operative.

Within the valve 10 a series of connecting passages 80 lead from the groove 46 to the interior of a hydraulic nozzle 82 mounted upon the block 36. This nozzle 82 is directed towards a beam 83, one extremity of which is pivotally mounted upon a pin 84 in a yoke 85 which is held upon a plate 86 which extends upwardly from the periphery of the rotor extension 74. In the construction illustrated the yoke 85 is held in place by a "press-fit" between it and the interior of a hole 87 in this plate 86. "Spent" fluid escaping from the nozzle 82 is conveyed back to the port 34 serving to convey return hydraulic fluid through an axial opening 82 in the rotor 22 which in turn is connected to this port by a passage 89 in the valve body 16.

From an examination of FIG. 5 of the drawings it may be realized that the beam 83 extends in a radial manner across the axis of the rotor 22 when it is in a normal or "null" position and that the beam 83 and the nozzle 82 are on opposite sides of this axis and are spaced from this axis different amounts. The beam 83 is, as shown, capable of rotating about an axis which is parallel to the axis of the rotor 22. Further, the nozzle 82 is preferably located close to the beam 83 as indicated so that any hydraulic fluid passing from this nozzle will hit against the beam 83, creating a back pressure within the interior of the nozzle 82 and, hence, within the interior of the groove 46 and the interior of the cylinder 58 holding the piston 66. Some such back pressure will always be created during the use of the valve 10.

The amount of such pressure is normally governed by means of a small torque motor 88 which is mounted upon a cover 90 inclosing various exposed parts on the surface of the block 36 remote from the housing 12. This cover may be securely held in place through the use of a retainer sleeve 92 which is attached to the block 36. With this construction the cover 90 is preferably formed of a non-magnetic material and holds pole pieces 94 between which there are located permanent magnets 96 and electrical coils 98. These coils 98 within the torque motor 88 are traversed by a ferromagnetic armature 100 which is carried by a flex spring-like tube 102 of beryllium copper or other similar material having spring-like qualities. The extremity of this tube 102 remote from the armature 100 is secured in a known manner to the cover 90 around a hole 104 in this cover. The tube 102 serves as a spring isolating against hydraulic leakage the area generally between the cover 90 and the block 36. The armature 100 also carries a flapper 106 which extends through the center of the tube 102 to adjacent to the beam 83. This flapper 106 terminates in a small "knife edge" 108 which normally bears against the side of the beam 83 remote from the nozzle 82.

During the use of the complete valve 10 when an electrical current is supplied to the coils 98 through wires 110 this current causes the armature 100 to tilt slightly. Such bending is permitted because of the flexible, spring-like character of the tube 102 which supports this armature 100. As a result of such movement the edge 108 is moved with respect to the beam 83 so as to either increase or decrease the pressure exerted upon this beam by it. As a consequence of this movement the balance of forces with respect to the beam 83 is changed; as a consequence of this the beam 83 is moved with respect to the nozzle 82. This, in turn, changes the back pressure within the interior of this nozzle 82 and in turn results in a change in the pressure within the groove 46 and the cylinder 58 holding the large piston 66. As a consequence of this a temporary pressure differential is created between the interiors of the two cylinders 58; this in turn causes the pistons 64 and 66 to move, causing rotation of the rotor 22 in one direction or another depending upon the direction of the electric signal supplied to the coils 98. Depending upon the nature of this signal the rotor 22 is thus turned either clockwise or counterclockwise so as to move the notches 24 with respect to the valve ports 26 in order to achieve the desired valving action.

As the rotor 22 is turned in this manner the plate 86 serving to mount the beam 83 will also be rotated. As a consequence of this rotation the position of this beam 83 will be varied with respect to the edge 108 and the nozzle 82 until a "balanced" force situation with respect to the forces acting on or moving this beam 83 is achieved. Thus, after an amount of rotation of the rotor 22 proportional to the electrical signal applied to the torque motor 88 is achieved the entire system of force within the complete valve 10 will tend to resume a "balanced" state such that the pistons 64 and 66 will not move with respect to one another.

When the electrical signal is no longer supplied to the coils 98 within the torque motor 88 is "disconnected." The spring character of the tube 102 will then gradually return the knife edge 108 to its initial position against the pressure of the beam 83. This in turn will result in pressure changes of the type described in the preceding discussion, and such pressure changes will of course lead to rotation of the valve rotor 22 back to its original or null position through the same type of action discussed in the preceding. In this position the valve 10 is in a closed position.

In this valve 10 in effect the entire mechanism mounted upon or directly associated with the block 36 constitutes what may be termed a "mechanical feed-back structure" inasmuch as this structure utilizes the pressure of hydraulic fluid supplied to the complete valve 10 so as to accomplish valve actuation or rotation in accordance with the movement of the small flapper 106 serving as a control member extending from the torque motor 88 so as to operate in connection with the nozzle 82. The type of structure involved employing this type of mechanical feedback of hydraulic pressure in order to achieve valve actuation is considered to be quite advantageous and desirable inasmuch as it is relatively simple and easily constructed. Further, the type of structure employed in a feed-back device as shown is exceedingly reliable and in effect is immune to practically all types of abnormal conditions such as extreme ambient temperatures, extreme vibration and the like. Further, its operation is not influenced by variations in pressure supplied to this structure.

The same type of mechanical feed-back action can be achieved by using a modified type of electro hydraulic servo valve 112 as indicated in FIG. 9 of the drawings. This modified valve 112 essentially is identical to the valve 10 except for a certain specific part as herein indicated. For this reason various parts of the modified valve 112 indicated in FIG. 9 which are identical to or substantially identical to parts previously explained and described are not separately identified herein and are shown in FIG. 9 of the drawings and in the remainder of this specification by the primes of the numerals previously employed.

In the modified valve 112 the beam 83 used in the valve 10 is omitted and is replaced by a small spring 114 which is mounted on the plate 86' by means of a terminal cylinder 116 which is pressed into place in the hole 87'. This spring 114 is used within the valve 112 in a manner which is very similar to the manner in which the beam 83 is used. Because of this it is not considered necessary to set forth in this specification a detailed description as to how the modified valve 112 operates. However, it is noted that the spring 114 differs as to performance characteristics from the beam 83 inasmuch as it is a resilient member. Hence, movement of the edge 108' or of the rotor 22' in this modified valve 112 causes a deformation of the spring 114 whereas with the beam 83 such deformation does not occur.

Those skilled in the art to which this invention pertains will realize that electro-hydraulic servo valves as herein described possess a number of advantages over prior related structure. Many of these advantages are set forth in the preceding portions of this specification. In general, however, it may be stated that valves as herein described can be formed so as to be efficient, reliable, light in weight and so as to be capable of being used in controlling the movement of hydraulic fluid at extreme pressures in response to comparatively "small" or "weak" electrical signals. It will further be realized that on a comparative basis valves as herein described may be constructed comparatively inexpensively. Because of the nature of this invention it is to be considered as being limited only by the appended claims forming a part of this disclosure.

This application is a continuation in part of application Serial No. 766,168 filed September 29, 1958, now Patent 2,961,002, entitled "Electro-Hydraulic Servo Valves," and application Serial No. 836,504, filed August 27, 1959, entitled "Electro-Hydraulic Servo Valves," and also contains subject matter set forth in application Serial No. 55,653, filed September 13, 1960, entitled "Hydraulic Servo Valves."

I claim:

1. A mechanical feed back servo valve which includes: rotary valve means including a housing having a pressure passage and other passages formed therein and a valve rotor rotatably mounted in said housing, said rotor being capable of being rotated so as to place said pressure passage in communication with some of said other passages; mechanical feedback means operatively associated with said rotary valve means, said feed back means including means for dividing hydraulic fluid into two separate streams and for creating a pressure differential between said streams, said means for dividing being operatively connected to said pressure passage, means for rotating said rotor in accordance with said pressure differential operatively associated with said rotor and said means for dividing, and means for varying said pressure differential operatively associated with said rotor and said means for dividing; said torque motor means operatively associated with said feed back means, said torque motor means including flapper means for actuating said means for varying operatively associated with said means for varying.

2. A mechanical feedback valve as defined in claim 1, wherein said means for rotating comprises: a lever arm attached to said rotor so as to extend therefrom; a cylinder means connected to each of said streams, said cylinder means being located in opposite sides of said lever arm; and piston means located within each of said cylinder means being capable of contacting said lever arm so as to cause rotation of said rotor.

3. A mechanical feed-back valve as defined in claim 1, wherein said means for varying said pressure differential comprises: a nozzle connected to one of said streams so as to allow hydraulic fluid to escape therefrom; a member capable of being moved with respect to said rotor carried by said rotor, said member normally being located at the outlet from said nozzle so as to affect the pressure of hydraulic fluid within said one of said streams, and wherein said flapper engages said member on the side thereof remote from said nozzle so as to normally hold said member against movement away from said nozzle.

4. A mechanical feed-back valve as defined in claim 3, wherein said member is a beam, and wherein said beam is pivotally mounted on said valve rotor.

5. A mechanical feed-back valve as defined in claim 3, wherein said member is a spring, and wherein said spring is rigidly connected to said valve rotor.

6. A mechanical feed-back servo valve which includes: a rotary valve means, said rotary valve means including a housing having a pressure passage, a return passage and service passages located therein, and a valve rotor rotatably mounted in said housing, said rotor being capable of being rotated so as to place said pressure passage in communication with some of said service passages; mechanical feed-back means located in said housing, said mechanical feed-back means including first passage means leading from said pressure passage and other passage means leading from said first passage means, one of said other passage means including means for reducing hydraulic pressure located at the entrance thereto from said first passage, cylinder means open to the extremities of each of said other passage means so as to receive hydraulic fluid at different pressures from said pressure passage during the operation of said mechanical feed-back servo valve, piston means located in each of said cylinder means so as to extend therefrom, a lever arm attached to said valve rotor so as to extend therefrom, said piston means engaging opposite sides of said lever arm so as to be capable of rotating said valve rotor in response to fluid pressures in said cylinders, a nozzle connected to said one of said other passage means, a movable member carried by said valve rotor, said movable member normally being located adjacent to and opposite said nozzle means so as to be capable of creating back pressure within said one of said other passage means, said member being capable of being moved with respect to said nozzle by rotation of said valve rotor; and torque motor means secured to said mechanical feed-back means, said torque motor means including a movable armature, means for moving said armature operatively associated with said armature, a flapper extending from said armature and engaging said member on the side thereof remote from said nozzle, said flapper serving to hold said member adjacent to said nozzle against hydraulic pressure of fluid emitted from said nozzle during the operation of said mechanical feed-back valve; and means for conveying hydraulic fluid emitted from said nozzle to said return passage.

7. A mechanical feed-back valve as defined in claim 6 including spring means for holding said flapper in a position in which said valve rotor is located so that said pressure passage is out of communication with said service passages.

8. A mechanical feed-back valve as defined in claim 6 wherein said member is a beam, and wherein said beam is pivotally attached to said valve rotor.

9. A mechanical feed-back valve as defined in claim 6 wherein said member is a spring, and wherein an extremity of said spring is secured to said valve rotor.

10. A mechanical feed-back servo valve which includes: rotary valve means including a housing having a pressure passage and other passages formed therein and a valve rotor rotatably mounted in said housing, said rotor being capable of being rotated so as to place said pressure passage in communication with some of said other passages; mechanical feed-back means operatively associated with said rotary valve means, said feed-back means including means for dividing hydraulic fluid into two separate streams and for creating a pressure differential between said streams, said means for dividing being operatively connected to said pressure passage, means for rotating said rotor in accordance with said pressure differential operatively associated with said rotor and said means for dividing; said torque motor means operatively associated with said feed-back means, said torque motor means including means for actuating said means for varying said pressure differential in response to a control signal operatively connected to said means for varying said pressure differential.

No references cited.